United States Patent

[11] 3,581,954

| [72] | Inventor | Wilfred Prentice<br>Assiniboid, Saskatchewan, Canada |
|---|---|---|
| [21] | Appl. No. | 808,098 |
| [22] | Filed | Mar. 18, 1969 |
| [45] | Patented | June 1, 1971 |
| [32] | Priority | Mar. 22, 1968 |
| [33] | | Canada |
| [31] | | 015,614 |

[54] MEASURING AND DISPENSING APPARATUS
9 Claims, 8 Drawing Figs.

[52] U.S. Cl. .................................................. 222/361,
222/368
[51] Int. Cl. .................................................. G01f 11/10
[50] Field of Search ........................................... 222/361,
368, 342, 344, 357, 359, 370

[56] References Cited
UNITED STATES PATENTS

| 3,217,945 | 11/1965 | Monaco | 222/361 |
| 3,276,637 | 10/1966 | Fender | 222/361X |

*Primary Examiner*—David M. Bockenek
*Attorney*—Stevens, Davis, Miller & Mosher

ABSTRACT: A metering and dispensing apparatus detachably mounted on a hopper converting the latter to a dispenser. The hopper is detachably mounted on a farm implement for selectively dispensing poisons to irradicate rodents. The metering and dispensing element includes a mounting plate with a measuring and dispensing element movably mounted by apparatus remotely controlled.

PATENTED JUN 1 1971 3,581,954

INVENTOR
WILFRED PRENTICE

By Stevens, Davis, Miller & Mosher

ATTORNEYS

PATENTED JUN 1 1971 3,581,954

INVENTOR
WILFRED PRENTICE

By Stevens, Davis, Miller & Mosher
ATTORNEYS 3,581,954

MEASURING AND DISPENSING APPARATUS

This invention relates to apparatus for dispensing measured quantities selectively from a container, and particularly to a combined meter and dispensing element adapted to be attached to a hopper for use in converting the same to a dispenser and also to such metering and dispensing element in combination with a hopper or supply container to which it attached.

There are numerous different types of dispensers for dispensing measured or selected quantities of material from a container but in most instances the dispensing and measuring element portion is an integral part or permanently attached to the hopper for holding the material to be dispensed. It is obvious that the container is the largest part of the apparatus in question and thus makes a relatively simple device bulky. This has a tendency to increase handling and ultimately the cost of the article in question.

It is an object of the present invention to provide a metering and dispensing element which may be readily attached to any container to provide an apparatus capable of dispensing material in the container. One of the principal advantages is that a purchaser may obtain the metering and dispensing element and attach the same to a container of his own and thus have a sophisticated and yet relatively cheap dispensing apparatus. A further advantage, of course, is that the supplier may manufacture both the hopper and the metering and dispensing element and keep the two separate for storage purposes and when shipping, they may be shipped in appropriate numbers. By having the apparatus kept separate, containers may be manufactured such that one may be stacked inside the other and thus minimize the bulkiness of the apparatus in question. Effectively, for a given area of storage, considerably more units can be stored in this manner.

Accordingly, there is provided in one aspect of the invention, a meter and dispensing element adapted to be attached to a supply container or hopper for use in measuring quantities of fluent material in the hopper and selectively dispense such measured quantity, comprising in combination a base member adapted to be secured to the hopper and having an aperture disposed so as to overlie a discharge aperture in the hopper when attached thereto, means for securing the base member to said hopper, a combined measuring and dispensing element mounted on said base member in underlying relationship with respect to said aperture, said measuring and dispensing element having a chamber positionable firstly, in registry with the aperture in the base member to receive contents from the hopper, and secondly, movable to a position for dispensing the contents therefrom, said measuring and dispensing element further including gate means for selectively closing said aperture during the dispensing of a measured quantity of contents from said chamber, and means secured to said mounting member and connected to said measuring and dispensing element for selectively moving the same from one position to the other.

In accordance with a further aspect of the present invention, there is provided a dispenser comprising, in combination, a hopper having sidewalls and a bottom wall with an aperture therein, and a metering and dispensing element detachably secured to said hopper for selectively discharging measured quantities of fluent material from the hopper, said meter and dispensing element including, in combination, a base member having an aperture disposed in overlying relationship with respect to a discharge aperture in the hopper, a combined measuring and dispensing element mounted on said base member in underlying relationship with respect to said aperture, said measuring and dispensing element having a chamber positionable firstly, in registry with the aperture in the base to receive contents from the hopper, and secondly, movable to a position for discharging the contents therefrom, said measuring and dispensing element further including gate means for selectively closing said aperture during dispensing of the contents from said chamber, and means secured to said mounting member and connected to said measuring and dispensing element for selectively moving the latter from one position to the other.

In each of the foregoing devices, the combined measuring and dispensing element may be mounted in such a manner as to be slidable along a selected path from one position to the other. Alternatively, the combined measuring and dispensing element may be mounted for rotation about a selected axis moving the chamber from one position to the other and wherein such axis is parallel to the plane of the aperture.

In a still more restricted form of the invention, there is included in combination with any of the forgoing apparatus, a metering plate having an aperture of preselected size located in overlying relationship with respect to the aperture in said base member and being of smaller size than such aperture to control the flow of fluent material from the container into the chamber of the measuring and dispensing element.

The invention is illustrated by way of example, in the accompanying drawings wherein.

Figure 1:
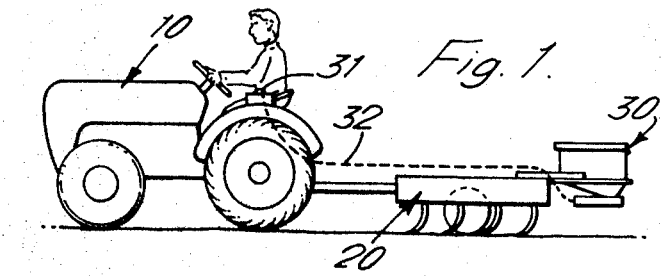
FIG. 1 is a side elevational view diagrammatically illustrating one use to which a device constructed in accordance with the present invention may be utilized.

Referring now in detail to the drawings, shown in FIG. 1 is a tractor 10 pulling a farm work implement 20 which, for example might be a cultivator or the like for working the soil. Attached to the implement 20 is a device 30 for use in selectively dispensing rodent control material such as poisoned grain. The operator of the tractor 10 may selectively dispense measured quantities of poisoned material from the apparatus 30 by operating an actuator 31 located within his reach on the tractor 10. As will be seen hereinafter, the dispensing mechanism is electrically operated and, accordingly, the actuator 31 is connected to the dispenser 30 by a conductor cable 32.

The dispenser 30 consists of a hopper 40 having brackets 50 for detachably securing the same to the implement 20 and a combined metering and dispensing element 60 detachably secured to the hopper.

Figure 3:
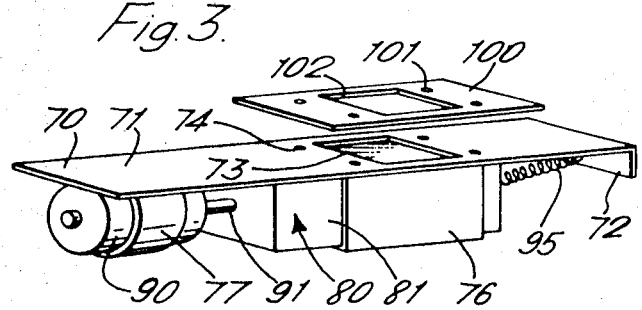
FIG. 3 is an exploded view illustrating the major components of one embodiment of a metering and dispensing element constructed in accordance with the present invention.

The present invention concerns mainly the dispensing and metering element 60 which may be detachably secured to any container for the purpose of providing a dispensing apparatus having a container for holding a supply of material to be dispensed. The invention is also concerned with the combination of the dispensing and metering element 60 and a hopper 30. The principal components of the dispenser and measuring element 60 are illustrated in FIG. 3 and from this it is readily seen to include a base member 70, a measuring and dispensing element 80 and an actuator 90. If desired, a mounting plate 100 may also be provided which, as will be seen hereinafter, can also serve as a metering plate controlling the flow of contents from the hopper 30 into the measuring element 80.

The base member 70 is a substantially flat plate member 71 having a downwardly turned end portion 72 and a main aperture 73. The main aperture 73 is surrounded by a plurality of apertures 74 adapted to receive screws, bolts, or the like 75 (see FIG. 4) for mounting the member 60 on the hopper 30. Depending from the plate 71 is a stirrup member 76 and a mounting bracket 77. The mounting racket may, for example, be an annular bandlike member having means for adjusting the size of the same for clampingly holding the actuator 90. The stirrup 76 is substantially U-shaped and provides a guide for slidably retaining the dispenser element 80 in sliding contact with the lower face of the plate member 71. The stirrup 76, as will be seen hereinafter, is of sufficient width as to provide a bottom wall closing an otherwise open chamber in the dispensing element 80 as will be seen hereinafter.

Figure 4:
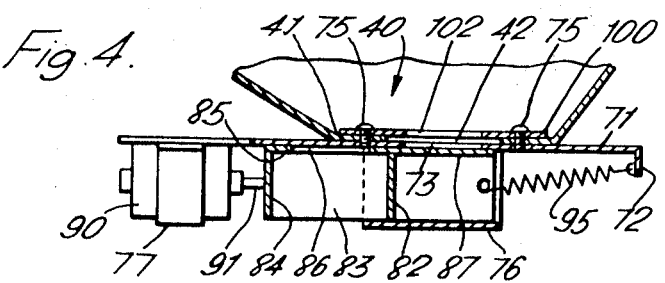
FIG. 4 is a partial sectional view of a device of the type illustrated in FIG. 3 attached to a hopper.

The dispensing element 80 consists of a chamber closed by four sidewalls 81, 82, 83 and 84 and has an open bottom wall. The chamber is also defined by a top wall 85 having an aperture 86 selectively positionable in registry with the aperture 73 in the base member 71. The wall 85 has a portion 87 extending beyond the wall 82 and provides a gate selectively for closing the aperture 73 when the dispensing element 80 is moving to a dispensing position, that is, the position in which it is illustrated in FIG. 4. The aperture 86 in the dispensing and measuring element 80 is selectively positionable below the aperture 73 in the plate 71 for receiving fluent material from the hopper. The stirrup 76 is of a width sufficient to close the open bottom wall of the element 80 when the aperture 86 is in registry with the aperture 73. In such position, the measuring and dispensing element has the chamber located for receiving a quantity of material governed by the size of the chamber. If desired, the end wall 82 or 84 may be selectively movable so as to vary the volume of the chamber and thus permit varying the quantity of material dispensed in each single operation.

The measuring and dispensing element 80 is connected to a plunger 91 of the actuator 90 which, in the preferred form consists of an electromagnet powered, for example, by the electrical system of the tractor 10, or alternatively, by a battery provided for some other purpose or solely for the purpose of actuating the electromagnet. The cable conductor 32, in the embodiment illustrated in FIG. 1 is connected to the control element 31 located beside the tractor operator and at the other end, the cable is connected to the electromagnet element 90. Suitable switching may be provided so as to positively move the dispensing and measuring element 80, first in one direction and subsequently in the other direction, or alternatively, the electromagnet 90 may be single-acting moving it, for example, to the left as viewed in FIG. 1 for moving the element 80 to a dispensing position. The element 80, in such instance, may be returned by a tension spring or elastic member 95 anchored respectively to the dispensing element 80 and the plate 71. For example, it may be attached to the end wall 82 of the element 80 and at the other end to the downwardly directed flange 72 of the plate member 71.

In operation, the operator may observe rodents, for example, gophers while doing field work in a selected area and by pushing a button on the operating member 32 may actuate the dispenser for dispensing a quantity of poisoned material, for example, grain. In the normal rest position of the measuring and dispensing element 80, it is located to the right as viewed in FIG. 4 with the aperture 86 in registry with the aperture 73 in the mounting plate 70. When the member 90 is actuated, it then pulls the element 80 to the left as viewed in FIG. 4, moving the element 80 to the left so as to position the open bottom wall to the left of the stirrup 76 thus dispensing the poisoned material otherwise held captive in the chamber of element 80. When the element 80 moves to the left, the plate 87 is moved into a position in overlying relationship with respect to the aperture 73 thus providing a gate preventing further flow of the material from the chamber until such time as the dispensing element is returned to its filling or normal rest position.

As previously mentioned, a mounting plate 100 may be provided and located on the side of the plate 71 opposite to that of the stirrup 76. The mounting plate 100 may be located within the chamber of hopper 40 and have a plurality of apertures 101 located in alignment with the apertures 74 in the member 70. The mounting plate 100 includes an aperture 102 located substantially in registry with the aperture 73. If desired, the aperture 102 may be of preselected size to control the flow of fluent material from the hopper 40 into the chamber of the dispensing element 80. In this manner, the rate of flow may be controlled so as to prevent dispensing beyond a certain rate. In this regard, it will be realized that if the flow through aperture 102 is controlled so as to take a certain time for filling the chamber of dispenser element 80, actuation of element 90 at too rapid a rate would only result in dispensing the material from the element 80 before the chamber therein has been completely filled. The plate 100, accordingly, may serve the dual function of clampingly engaging the bottom wall of the hopper against the plate 71 and also meter the fluent material from the hopper 40 into the chamber of the dispensing and measuring element 80.

Figure 5:
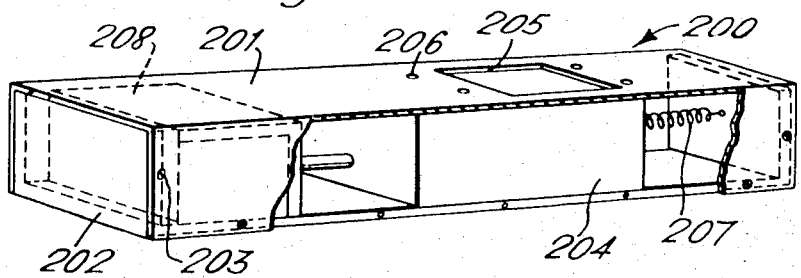
FIG. 5 is a partial sectional oblique view diagrammatically illustrating a further embodiment of the present invention.

There is illustrated in FIG. 5 an alternative to the construction of the device illustrated in FIG. 1. Operation of the two different devices, however, is the same.

Referring to FIG. 5, there is illustrated a measuring and dispensing element 200 consisting of a channel-shaped base member 201 having a cover plate 202 detachably secured thereto by, for example, a plurality of sheet netal screws 203. The cover member 202 and the channel member 201 accordingly provide an enclosed chamber having a dispensing and measuring element 204 slidably mounted therein. The U-shaped channel member 201 has a main aperture 205 located in the web portion thereof and is surrounded by a plurality of apertures 206. The apertures 205 and 206 correspond respectively to apertures 73 and 74 described previously with reference to FIG. 3. The combined measuring and dispensing member 204 is the same as that illustrated in FIG. 3 and identified by reference numeral 80 and is held captive by the flanges and web of the U-shaped or channel member 201 and the cover member 202. The member 204 may be returned to a normal rest position by a tension spring 207 and it may be moved to a dispensing position against the tension of spring 207 by an electromagnet 208 conveniently secured to either the cover member 202 or the channel member 201. In each of the embodiments illustrated in FIGS. 3 and 5, the electromagnet may be mounted so as to be selectively positionable at different locations along the length of the base member and thus provide means for varying the dispensing and loading position of the measuring and dispensing element. A mounting and metering plate 100 illustrated in FIG. 3 may be used in combination with the apparatus illustrated in FIG. 5 and in which case it may provide the same function as previously described.

Figure 6:
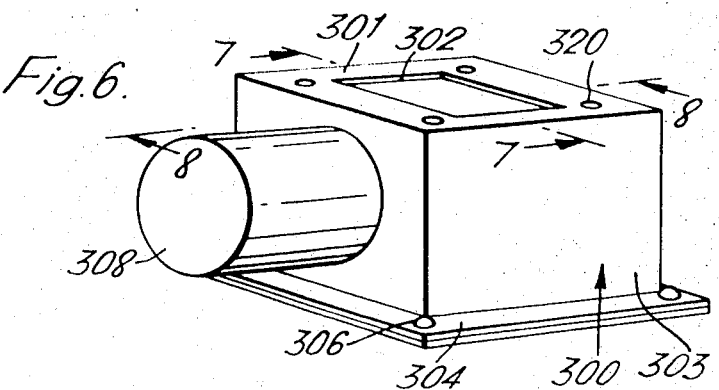
FIG. 6 is an oblique view of a still further embodiment of the present invention.
Figure 7:
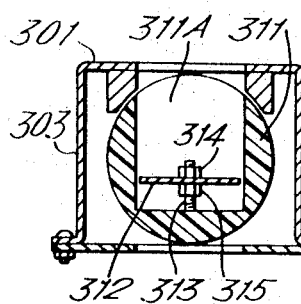
FIG. 7 is a cross-sectional view taken substantially along section 7-7 of FIG. 6.
Figure 8:
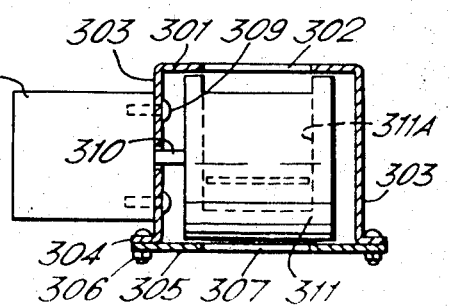
FIG. 8 is a partial sectional view taken substantially along section 8-8 of FIG. 6.

A further embodiment is illustrated in FIGS. 6, 7 and 8 wherein the measuring and dispensing element is mounted for rotation about a selected axis rather than for reciprocal movement along a selected axis as in the previous embodiments. Referring now to FIGS. 6, 7 and 8, there is illustrated a metering and dispensing element 300 which may be detachably secured to a hopper by a plurality of bolts, sheet metal screws or the like. The device 300 consists of a casing member 301 having an aperture 302 located in a top wall and surrounded by downwardly directed sidewalls 303. The sidewalls terminate in an outwardly directed flange 304 to which is secured a cover member 305 by a plurality of sheet metal screws, bolts, or the like 306. The cover member 305 has an aperture 307. An electromagnetic actuator, for example, a motor 308 is attached to a sidewall 303 by a plurality of bolts, studs or the like 309 and includes a shaft 310 projecting inwardly into the casing. A dispensing and measuring element 311 is secured to the shaft and includes an aperture 311A wh..ch may be of fixed volume or selectively variable. With regards to the latter, a bottom wall may be provided which is movable and, for example, may consist of a plate member 31.' slidably mounted on one or more pins 313 anchored to the member 311. The plate 312 may be selectively positioned along the length of the pin or pins 313 and held captive by locking members 314 and 315 engaging respectively opposed faces of the plate 312. The measuring and dispensing element 311 may be molded from plastic and has a circular outline as illustrated in FIG. 7. The cavity has an opening which is selectively positionable, firstly in registry with the aperture 302 and subsequently in registry with the aperture 307 respectively to receive contents from a container such as hopper 40 and discharge the received contents by dropping the same vertically downwards. The casing 301 may be suitably shaped on the interior to be disposed in close engagement with the rotatable member 311 providing seals adjacent the apertures 302 and 307.

Figure 2:
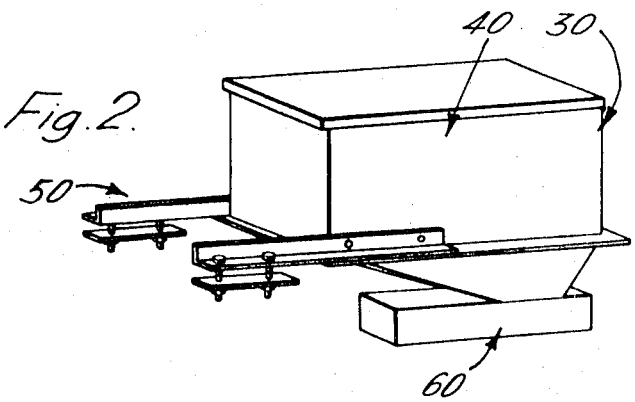
FIG. 2 is an oblique view of a hopper having a metering and dispensing element attached thereto.

The motor 310 is of the type which upon actuation, rotates 180° with the normal rest position normally being that as illustrated in FIG. 7, that is, a loading position with respect to chamber 310. In this regard, a simple circuit may be provided such that the motor 308 is actuated causing member 311 to rotate 180° at which point a switch is actuated by a cam secured to the shaft 310, breaking the circuit to the motor. Return from a dispensing to a loading position may be effected in the same manner, or alternatively, movement of the dispensing element 310 through 180° may be against the action of a torsion spring which will return the element 311 to a loading position. The measuring and dispensing element illustrated in FIGS. 6, 7 and 8 may be attached to the hopper 40 illustrated in FIG. 2 in the same manner as is the device 60. For this purpose, the top wall 301 of the casing is provided with a plurality of apertures 320 for receiving bolts 75 as illustrated in FIG. 4. A mounting and metering plate 100 described with reference to FIG. 3, may be utilized with the assembly 300 and positioned, for example, as illustrated in FIG. 4 to engage the bottom wall of the hopper on the side opposite to that which is engaged by the dispensing and measuring device.

From the foregoing, it is seen there is provided a unit which may be attached to a hopper for converting the same to a dispenser and also a dispenser which may be readily attached to a vehicle for use, for example, in controlling rodents.

I claim:

1. A meter and dispensing component adapted to be detachably secured to a supply hopper for use in measuring quantities of fluent material in the hopper and selectively discharging such measured quantities comprising, in combination:
   a. a base member adapted to be secured to the hopper and having an aperture disposed so as to overlie a discharge aperture in the hopper when attached thereto;
   b. means for detachably securing the base member to said hopper;
   c. a combined measuring and dispensing element mounted on said base member in underlying relationship with respect to said aperture, said measuring and dispensing element having a chamber positionable firstly, in registry with the aperture in the base member to receive contents from the hopper, and secondly, movable to a position for discharging the contents therefrom, said measuring and dispensing element further including gate means for selectively closing said aperture during discharge of a measured quantity of contents from said chamber; and
   d. power-operated means adapted for remote control operation secured to said mounting member and connected to said measuring and dispensing element for selectively moving the latter from one position to the other.

2. An apparatus as defined in claim 1 wherein said combined measuring and dispensing element is mounted for selected reciprocal movement from one position to the other.

3. An apparatus as defined in claim 1 wherein said combined measuring and dispensing element is mounted for rotation about an axis parallel to the plane of the aperture for moving the chamber therein from one position to the other.

4. An apparatus as defined in claim 1 including a metering plate having an aperture therein of preselected size and smaller than said aperture in said baseplate and being adapted to be located in overlying relation with respect to the aperture thereto, said metering plate being located on the side of the baseplate opposite to that of the combined measuring and dispensing element.

5. An apparatus as defined in claim 1 including resilient means normally biasing such element to a rest position wherein the chamber of the dispensing element is located in registry with the aperture in the base.

6. Apparatus as defined in claim 1 wherein at least the combined measuring and dispensing element is made of a synthetic plastic material.

7. An apparatus as defined in claim 1, including adjustable means selectively to vary the volume of said chamber in the measuring and dispensing element.

8. An apparatus as defined in claim 7 wherein said means includes a wall movably mounted on said element.

9. The apparatus of claim 1 in which the power-operated means (d) is an electromagnet.